(12) United States Patent
Lamas et al.

(10) Patent No.: US 11,144,528 B2
(45) Date of Patent: *Oct. 12, 2021

(54) EVENT TIME SELECTION OUTPUT TECHNIQUES

(71) Applicant: SPLUNK INC., San Francisco, CA (US)

(72) Inventors: Divanny I. Lamas, San Francisco, CA (US); Marc Vincent Robichaud, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 16/177,027

(22) Filed: Oct. 31, 2018

(65) Prior Publication Data

US 2019/0065541 A1    Feb. 28, 2019

Related U.S. Application Data

(63) Continuation of application No. 14/525,048, filed on Oct. 27, 2014, now Pat. No. 10,127,258.

(60) Provisional application No. 62/057,453, filed on Sep. 30, 2014.

(51) Int. Cl.
*G06F 16/00* (2019.01)
*G06F 16/22* (2019.01)
*G06F 16/2458* (2019.01)

(52) U.S. Cl.
CPC ...... *G06F 16/2291* (2019.01); *G06F 16/2477* (2019.01)

(58) Field of Classification Search
CPC .................... G06F 16/2291; G06F 16/2477
See application file for complete search history.

(56) References Cited

U.S. PATENT DOCUMENTS

| | | | |
|---|---|---|---|
| 2007/0033632 A1* | 2/2007 | Baynger | G11B 27/105 725/135 |
| 2007/0055782 A1 | 3/2007 | Wright et al. | |
| 2007/0288279 A1* | 12/2007 | Haugen | G06Q 10/109 705/7.21 |
| 2009/0024650 A1* | 1/2009 | Kamani | G06F 16/90 |
| 2011/0099500 A1* | 4/2011 | Smith | H04L 41/22 715/771 |
| 2015/0128267 A1 | 5/2015 | Gupta et al. | |
| 2015/0293685 A1* | 10/2015 | Chen | G06Q 10/10 715/804 |

* cited by examiner

*Primary Examiner* — Alexander Khong
(74) *Attorney, Agent, or Firm* — Shook, Hardy & Bacon L.L.P.

(57) ABSTRACT

Event time selection output techniques are described. In one or more implementations, one or more inputs are received, at one or more computing devices, that involve interaction associated with a particular one of a plurality of events via a user interface, in which the plurality of events result from a search of data, each of the plurality of events include the data that is associated with a respective point in time, and the one or more inputs specify a relative time in relation to the respective point in time of the particular event. A determination is made as to which of the plurality of events correspond to the specified relative time by the one or more computing devices and a result of the determination is output by the one or more computing devices for display in the user interface.

30 Claims, 24 Drawing Sheets

```
Original Search: 501
search "error | stats count BY host

Sent to peers: 502
search "error | prestats count BY host (map)

Executed by search head: 503
Merge prestats results received from peers (reduce)
```

Data Summary

| Hosts (5) | Sources (8) | Sourcetypes (3) | ✕ |
|---|---|---|---|

( filter )

| Host ◊ | | Count ◊ | Last Update ◊ |
|---|---|---|---|
| mailsv | ⊪ ˅ | 9,829 | 4/29/14 1:32:47.000 PM |
| vendor_sales | ⊪ ˅ | 30,244 | 4/29/14 1:32:46.000 PM |
| www1 | ⊪ ˅ | 24,221 | 4/29/14 1:32:44.000 PM |
| www2 | ⊪ ˅ | 22,595 | 4/29/14 1:32:47.000 PM |
| www3 | ⊪ ˅ | 22,975 | 4/29/14 1:32:45.000 PM |

Q New Search  
Save As ∨   Close index=_internal  
151,194 events (before 9/17/14 12:25:23.000 AM)  
Job ∨  Complete  All time ∨  🔍

Events (151,194) | Statistics | Visualization

Format Timeline ∨   − Zoom Out   + Zoom to Selection   ✕ Deselect          1 hour per column 814 ⟶     812 ⟶  List ∨  Format ∨  20 Per Page ∨      818 ⟶         ⟨ Prev  1  2  3  4  5  6  7  8  9  …  Next ⟩

| | Time | Event |
|---|---|---|
| ▸ | 9/17/14<br>12:25:21.201<br>AM | 127.0.0.1 - admin [17/Sep/2014:00:25:21.201 -0700] "POST /services/search/jobs/1410938721.5/control HTTP/1.0" 200 138 - - - 2ms<br>host = wimpy.splunk.com    source = /home/dlamas/dailies/bubbles/splunk/var/log/splunkd_access.log    sourcetype = splunkd_access ∼810 |
| ▸ | 9/17/14<br>12:25:21.191<br>AM | 127.0.0.1 - admin [17/Sep/2014:00:25:21.191 -0700] "GET /services/search/jobs/1410938721.5/results?offset=0&output_mode=xml&max_lines=100&show_empty_fields=True&time_format=%25Y-%25m-%25dT%25H%3A%25M%3A%255%25z&field_list=&count=1 HTTP/1.0" 200 253 - - - 3ms<br>host = wimpy.splunk.com    source = /home/dlamas/dailies/bubbles/splunk/var/log/splunkd_access.log    sourcetype = splunkd_access |
| ▸ | 9/17/14<br>12:25:21.175<br>AM | 127.0.0.1 - admin [17/Sep/2014:00:25:21.175 -0700] "GET /services/search/jobs/1410938721.5 HTTP/1.0" 200 9409 - - - 6ms<br>host = wimpy.splunk.com    source = /home/dlamas/dailies/bubbles/splunk/var/log/splunkd_access.log    sourcetype = splunkd_access |
| ▸ | 9/17/14<br>12:25:21.159<br>AM | 127.0.0.1 - admin [17/Sep/2014:00:25:21.159 -0700] "GET /services/search/jobs/1410938721.5 HTTP/1.0" 200 7634 - - - 6ms<br>host = wimpy.splunk.com    source = /home/dlamas/dailies/bubbles/splunk/var/log/splunkd_access.log    sourcetype = splunkd_access |

⟨ Hide Fields    ≡ All Fields

Selected Fields 802 ⟶  
a host 1  
a source 11  ⟵ 804  
a sourcetype 9

Interesting Fields  ⟵ 806  
a component 50  
date_hour 24  ⟵ 808  
date_mday 3

Q New Search

Save As ˅   Close sourcetype=access_combined   Date time range ˅   🔍

✓ 174 events (7/23/14 8:33:17.000 AM to 7/23/14 10:33:17.001 AM)

| Events (174) | Patterns | Statistics | Visualization |

Format Timeline ˅   — Zoom Out   + Zoom to Selection   ✕ Deselect

▸ Presets
▸ Relative
▸ Real-time
▸ Date Range
▾ Date & Time Range

Earliest:                         Latest:
07/23/2014   08:33:17.000         07/23/2014   10:33:17.001
HH:MM:SS.SSS                      HH:MM:SS.SSS ▸ Advanced                        [ Apply ]

| ‹ Hide Fields | ☰ All Fields | | List ˅   Format ˅   20 Per Page ˅ |

| | *i* | Time | Event |
|---|---|---|---|
| Selected Fields | › | 7/23/14 9:33:17.000 AM | 92.233.220.234 - - [23/Jul/2014:09:33:17 "https://www.google Gecko) Version/7.0 Mobi bytes = 179717 clientip = 92.233.220.234 host = jmiller-mbpr15.sv.splunk.com source = access_combined.log sourcetype = access_combined |
| # bytes 71 | | | |
| *a* clientip 48 | | | |
| *a* host 1 | › | 7/23/14 9:33:04.000 AM | 183.60.212.148 - - [23/Jul/2014:09:33:04 -0700] "GET /?feed=rss2&p=321 HTTP/1.1" 200 752 "-" "Mozilla/5.0 (compatib le; EasouSpider; +http://www.easou.com/search/spider.html)" bytes = 752 clientip = 183.60.212.148 host = jmiller-mbpr15.sv.splunk.com source = access_combined.log sourcetype = access_combined |
| *a* source 1 | | | |
| *a* sourcetype 1 | | | |
| Interesting Fields | › | 7/23/14 9:30:52.000 AM | 199.21.99.203 - - [23/Jul/2014:09:30:52 -0700] "GET /wp-content/gallery/paris/thumbs/thumbs_celinemaria-custom.jpg HTTP/1.1" 200 9605 "-" "Mozilla/5.0 (compatible; YandexImages/3.0; +http://yandex.com/bots)" bytes = 9605 clientip = 199.21.99.203 host = jmiller-mbpr15.sv.splunk.com source = access_combined.log sourcetype = access_combined |
| # date_hour 2 | | | |
| # date_mday 1 | | | |
| # date_minute 51 | | | |
| *a* date_month 1 | › | 7/23/14 9:30:28.000 AM | 157.55.39.203 - - [23/Jul/2014:09:30:28 -0700] "GET /?page_id=745&show=gallery&nggpage=2 HTTP/1.1" 200 43976 "-" "M ozilla/5.0 (compatible; bingbot/2.0; +http://www.bing.com/bingbot.htm)" bytes = 43976 clientip = 157.55.39.203 host = jmiller-mbpr15.sv.splunk.com source = access_combined.log sourcetype = access_combined |
| # date_second 54 | | | |
| *a* date_wday 1 | | | |
| # date_year 1 | | | |
| # date_zone 1 | › | 7/23/14 9:28:02.000 AM | 207.46.13.129 - - [23/Jul/2014:09:28:02 -0700] "GET /?p=1554&cpage=1 HTTP/1.1" 200 53235 "-" "Mozilla/5.0 (compatib le; bingbot/2.0; +http://www.bing.com/bingbot.htm)" bytes = 53235 clientip = 207.46.13.129 host = jmiller-mbpr15.sv.splunk.com source = access_combined.log sourcetype = access_combined |
| # file 43 | | | |
| *a* ident 1 | | | |
| *a* index 1 | › | 7/23/14 | 89.248.168.164 - - [23/Jul/2014:09:27:41 -0700] "POST /xmlrpc.php HTTP/1.0" 200 370 "-" "Mozilla/4.0 (compatible: M |
| # linecount 54 | | | |

EVENT TIME SELECTION OUTPUT TECHNIQUES

CROSS-REFERENCE TO RELATED APPLICATIONS

This Application is a Continuation of U.S. patent application Ser. No. 14/525,048, filed Oct. 27, 2014 and entitled "Event Time Selection Output Techniques," which claims priority under 35 U.S.C. Section 119(e) as a non-provisional application of U.S. Provisional Application No. 62/057,453, filed Sep. 30, 2014, and entitled "Event Time Selection Output Techniques", the disclosures of which are hereby incorporated by reference in their entirety.

BACKGROUND

Businesses and their data analysts face the challenge of making sense of and finding patterns in the increasingly large amounts of data in the many types and formats that such businesses generate and collect. For example, accessing computer networks and transmitting electronic communications across the networks generates massive amounts of data, including such types of data as machine data and Web logs. Identifying patterns in this data, once thought relatively useless, has proven to be of great value to the businesses. In some instances, pattern analysis can indicate which patterns are normal and which ones are unusual. For example, detecting unusual patterns can allow a computer system manager to investigate the circumstances and determine whether a computer system security threat exists.

Additionally, analysis of the data allows businesses to understand how their employees, potential consumers, and/or Web visitors use the company's online resources. Such analysis can provide businesses with operational intelligence, business intelligence, and an ability to better manage their IT resources. For instance, such analysis may enable a business to better retain customers, meet customer needs, or improve the efficiency of the company's IT resources. Despite the value that one can derive from the underlying data described, making sense of this data to realize that value takes effort. In particular, patterns in underlying data may be difficult to identify or understand when analyzing specific behaviors in isolation, often resulting in the failure of a data analyst to notice valuable correlations in the data from which a business can draw strategic insight.

SUMMARY

Event time selection output techniques are described. In one or more implementations, one or more inputs are received, at one or more computing devices, that involve interaction associated with a particular one of a plurality of events via a user interface, in which the plurality of events result from a search of data, each of the plurality of events include the data that is associated with a respective point in time, and the one or more inputs specify a relative time in relation to the respective point in time of the particular event. A determination is made as to which of the plurality of events correspond to the specified relative time by the one or more computing devices and a result of the determination is output by the one or more computing devices for display in the user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 6B illustrates a data summary dialog that enables a user to select various data sources in accordance with the disclosed implementations.

FIG. 7B illustrates an incident review dashboard in accordance with the disclosed implementations.

FIG. 8 depicts an example of a user interface that displays a plurality of events resulting from a search performed using one or more extraction rules of a late-binding schema.

FIG. 10 depicts an example of a user interface that includes an output of an option that is selectable to specify a relative time in relation to a point in time of a corresponding event.

FIG. 11 depicts an example of a user interface showing selection of "+/−1 day" portion of the option of FIG. 10.

FIG. 13 depicts a user interface showing specification of a unit of time using the option of FIG. 12.

FIG. 14 depicts a user interface showing specification of a unit of time using the option of FIG. 12.

FIG. 15 depicts a user interface showing another example of an option that is usable to specify a relative time in relation to a point in time of an event.

FIG. 16 depicts a user interface showing yet another example of an option that is usable to specify a relative time in relation to a point in time of an event.

FIGS. 17 and 18 illustrate additional examples of user interfaces in which the option is associated with a search input portion.

DETAILED DESCRIPTION

Overview

Figure 1:
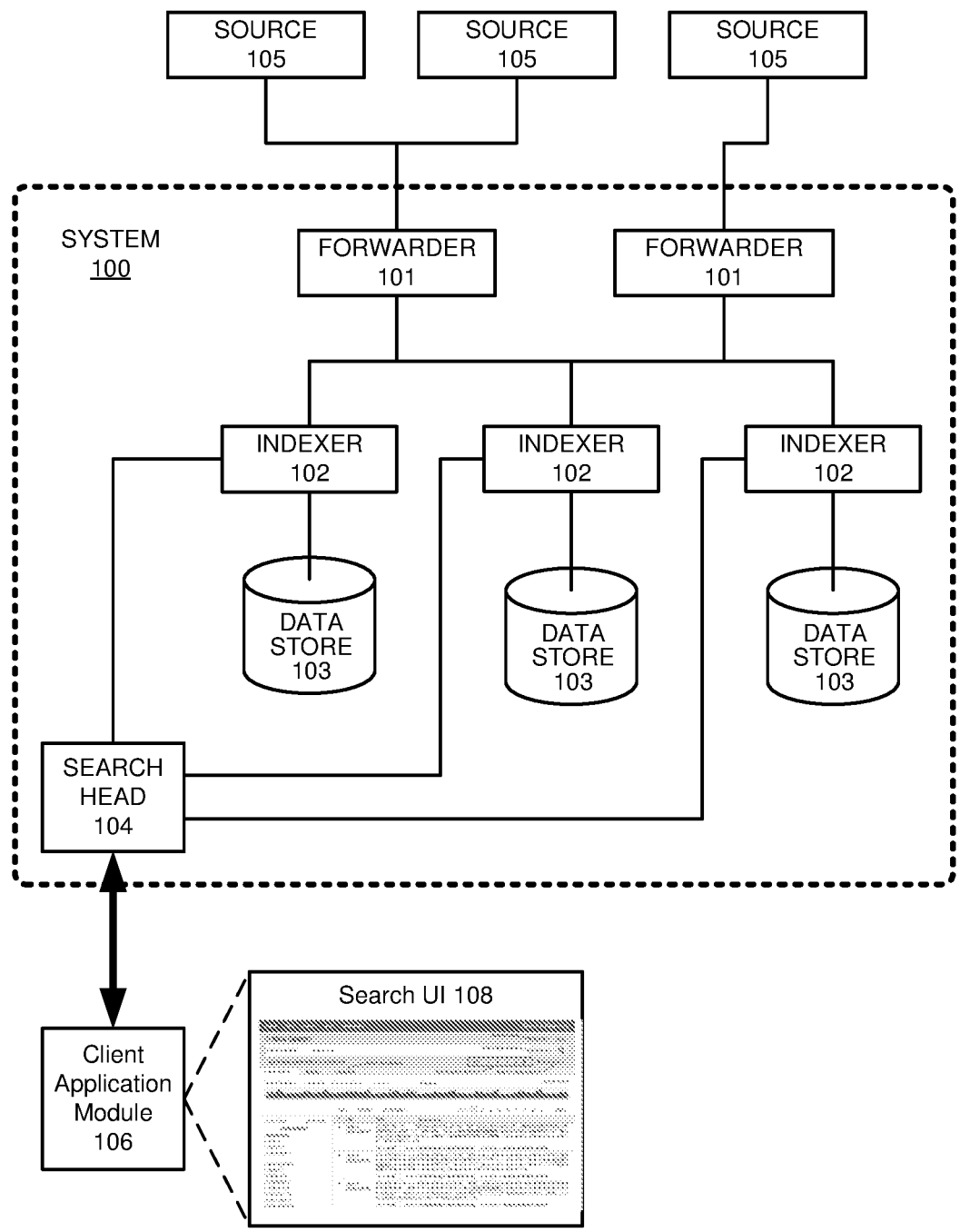
FIG. 1 presents a block diagram of an event-processing system in accordance with the disclosed implementations.

Data analysts are often confronted with navigating through vast amounts of data to locate data of interest. Techniques to perform this navigation often involve use of search queries which are run and after which a user may view the results. Conventional techniques to submit search queries, however, typically involve manual entry by a user and subsequent manual modification in order to navigate through the data, which may be time consuming and frustrating.

Event time selection output techniques are described. In one or more implementations, a user may submit a search query, such as through use of one or more extraction rules as part of a late binding schema to view events having fields and corresponding values for those fields in a user interface. An option is also provided, via which, a user may specify a relative time in relation to a point in time that corresponds to the events, such as a range of time before and/or after the point in time that corresponds to the event. In this way, the option may support efficient navigation to events that may be of interest that surround a particular event. Further discussion of these and other examples may be found in relation to the following sections.

In the following discussion, an example environment is first described that may employ the techniques described herein. Example event time selection output techniques and procedures are then described which may be performed in the example environment as well as other environments. Consequently, performance of the example techniques and procedures is not limited to the example environment and the example environment is not limited to performance of the example techniques and procedures.

Example Environment

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," in which each event comprises a collection of performance data and/or diagnostic information that is generated by a computer system and is correlated with a specific point in time. Events can be derived from "time series data," in which time series data includes a sequence of data points (e.g., performance measurements from a computer system) that are associated with successive points in time and are typically spaced at uniform time intervals. Events can also be derived from "structured" or "unstructured" data. Structured data has a predefined format, in which specific data items with specific data formats reside at predefined locations in the data. For example, structured data can include data items stored in fields in a database table. In contrast, unstructured data does not have a predefined format. This means that unstructured data can include various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, in which the flexible schema may be developed and redefined as needed. Note that a flexible schema may be applied to event data "on the fly" as desired (e.g., at search time), rather than at ingestion time of the data as in traditional database systems. Because the schema is not applied to event data until it is desired (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule includes a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

FIG. 1 presents a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, in which each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 2:
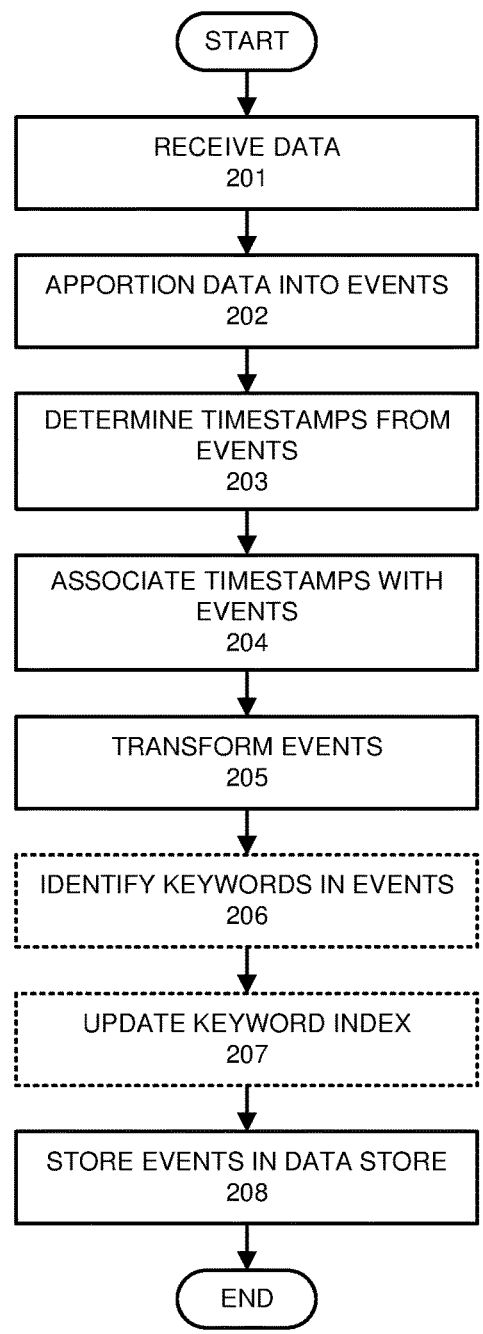
FIG. 2 presents a flowchart illustrating how indexers process, index, and store data received from forwarders in accordance with the disclosed implementations.

FIG. 2 presents a flowchart 200 illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, in which the indexer can be explicitly informed about the source of the data or can infer the source of the data by examining the data. These heuristic rules can include regular expression-based rules or delimiter-based rules for determining event boundaries, in which the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, in which each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. patent application Ser. No. 14/266,817 also filed on 30 Apr. 2014.

1.4 Query Processing

Figure 3:
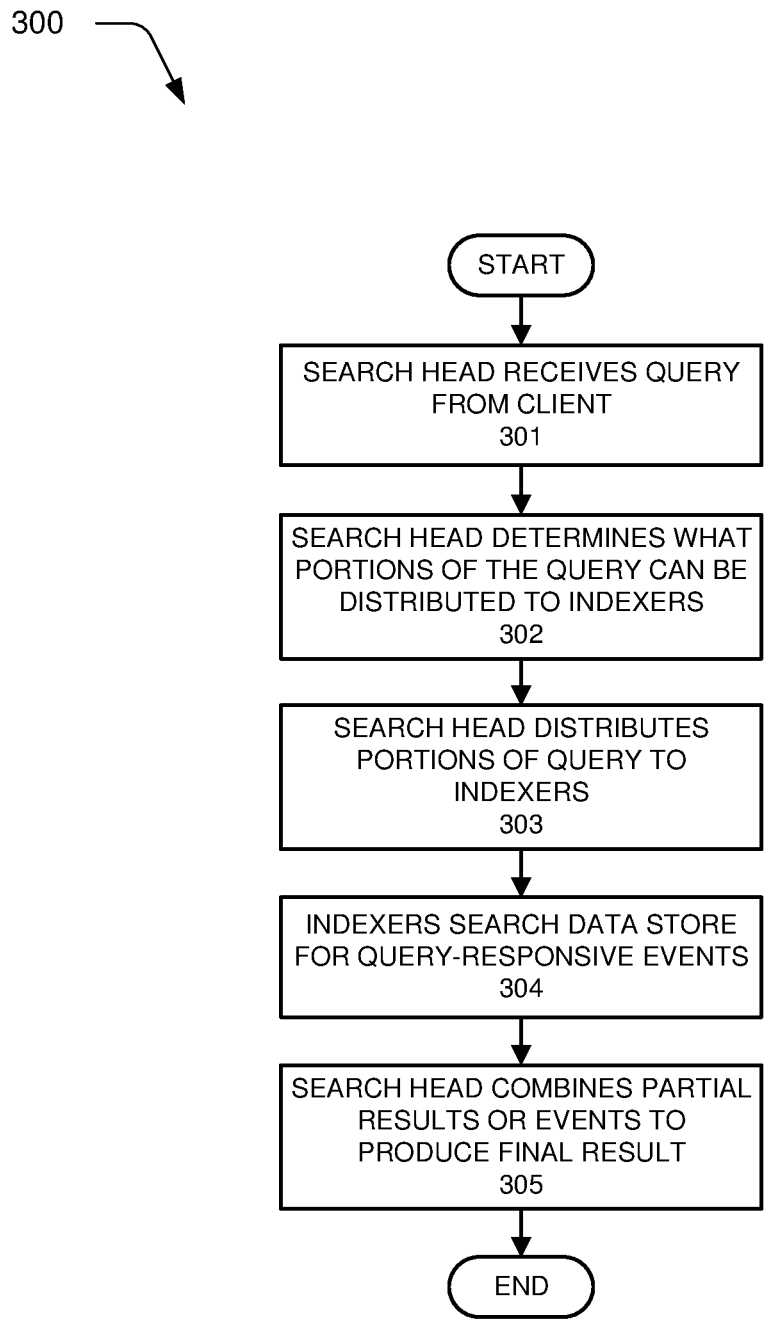
FIG. 3 presents a flowchart illustrating how a search head and indexers perform a search query in accordance with the disclosed implementations.

FIG. 3 presents a flowchart 300 illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 4:
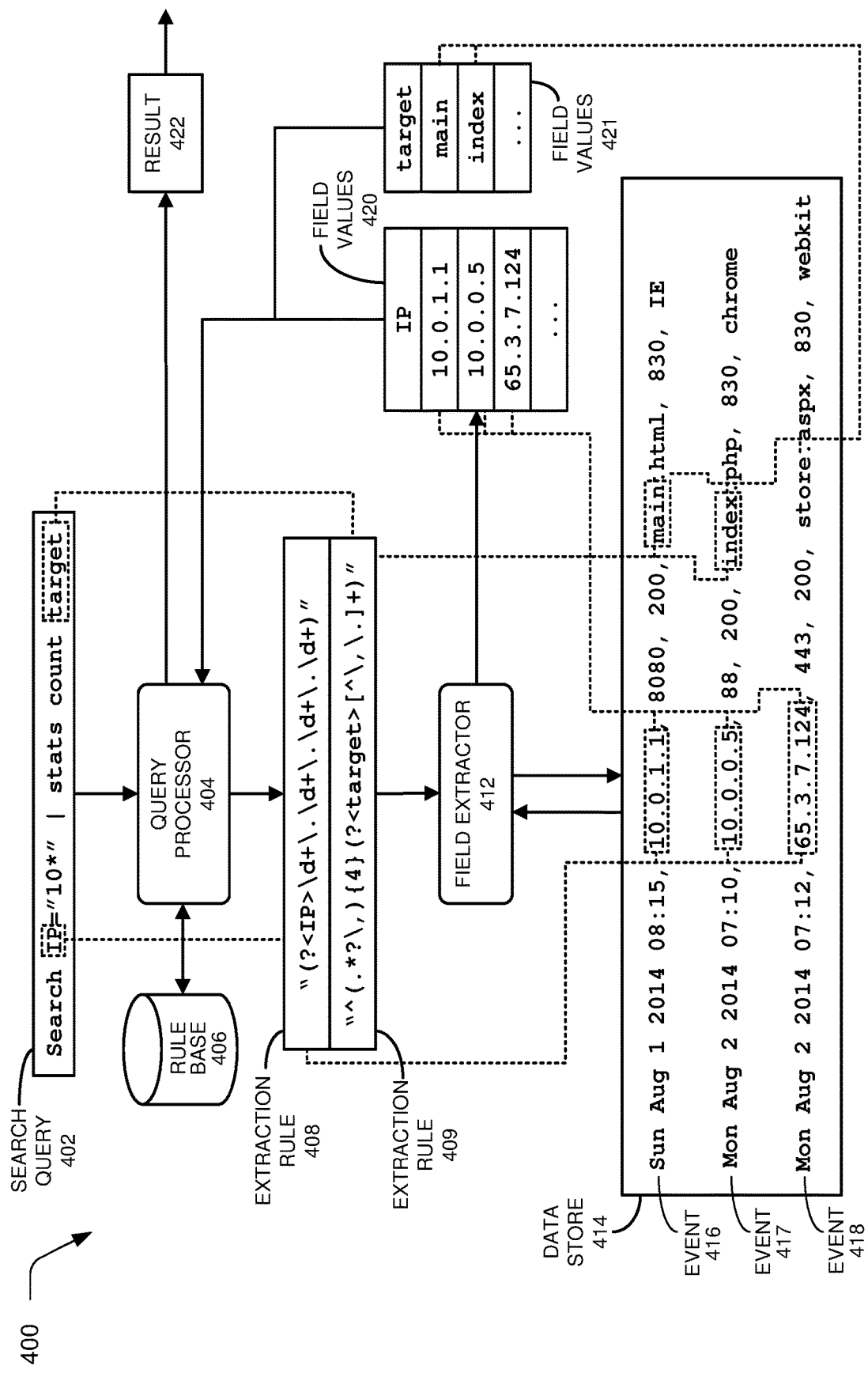
FIG. 4 presents a block diagram of a system for processing search requests that uses extraction rules for field values in accordance with the disclosed implementations.

FIG. 4 presents a block diagram 400 illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 4 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, in which rule base 406 maps field names to corresponding extraction rules and obtains extraction rules 408-409, extraction rule 408 specifies how to extract a value for the "IP" field from an event, and extraction rule 409 specifies how to extract a value for the "target" field from an event. As is illustrated in FIG. 4, extraction rules 408-409 can include regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 4. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command Search IP="10*" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Example Search Screen

Figure 6A:
FIG. 6A illustrates a search screen in accordance with the disclosed implementations.

FIG. 6A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

Figure 5:
FIG. 5 illustrates an exemplary search query received from a client and executed by search peers in accordance with the disclosed implementations.

To facilitate faster query processing, a query can be structured as a map-reduce computation, wherein the "map" operations are delegated to the indexers, while the corresponding "reduce" operations are performed locally at the search head. For example, FIG. 5 illustrates an example 500 of how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

1.7.2 Keyword Index

As described above with reference to the flow charts 200, 300 in FIGS. 2 and 3, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process each of the events that have a specific field-value combination, the system can use the references in the summarization table entry to directly access the events to extract further information without having to search each of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, in which the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover each of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

1.8 Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. No. 13/956,252, and Ser. No. 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 7A:
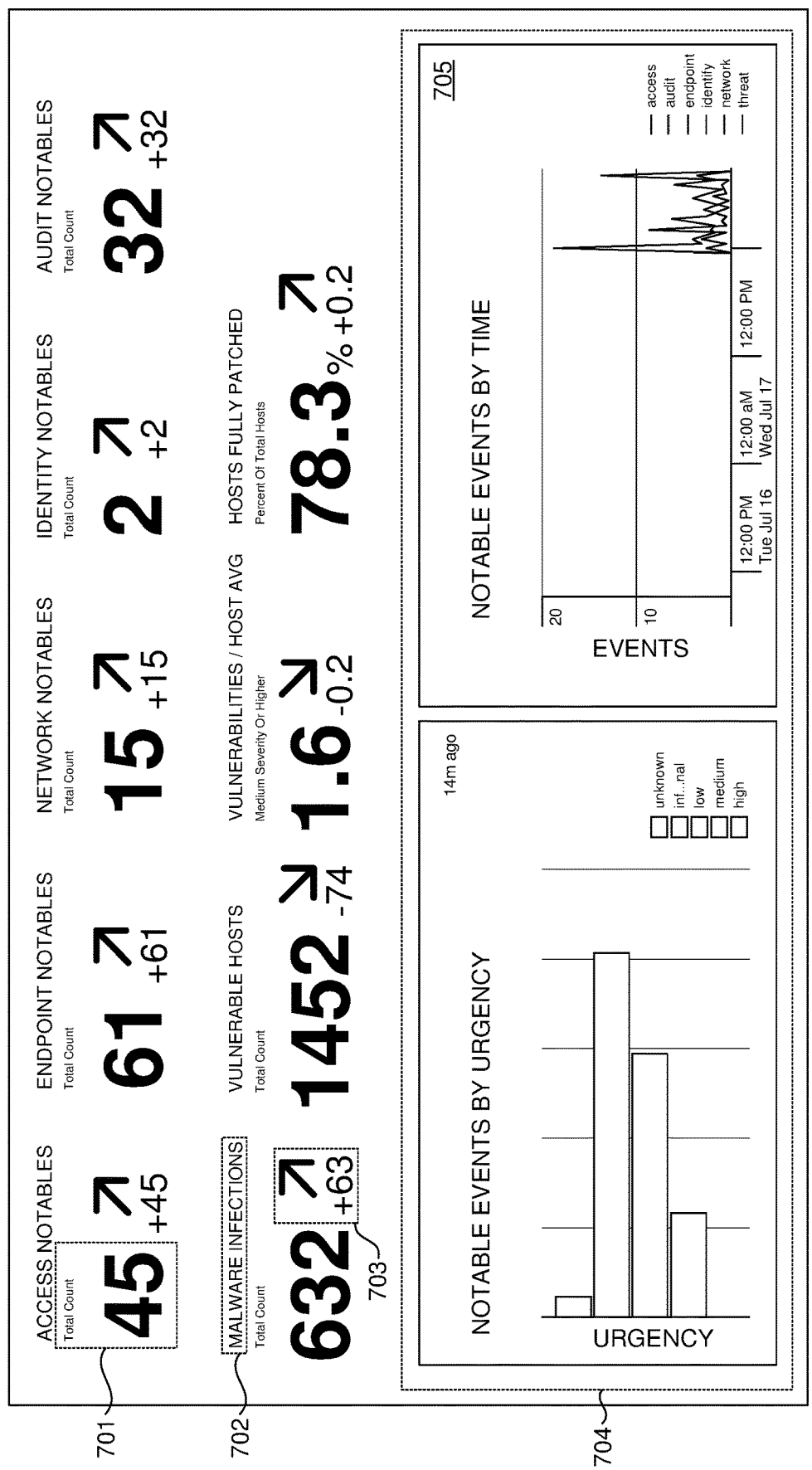
FIG. 7A illustrates a key indicators view in accordance with the disclosed implementations.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 7A illustrates an exemplary key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 705 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 7B:
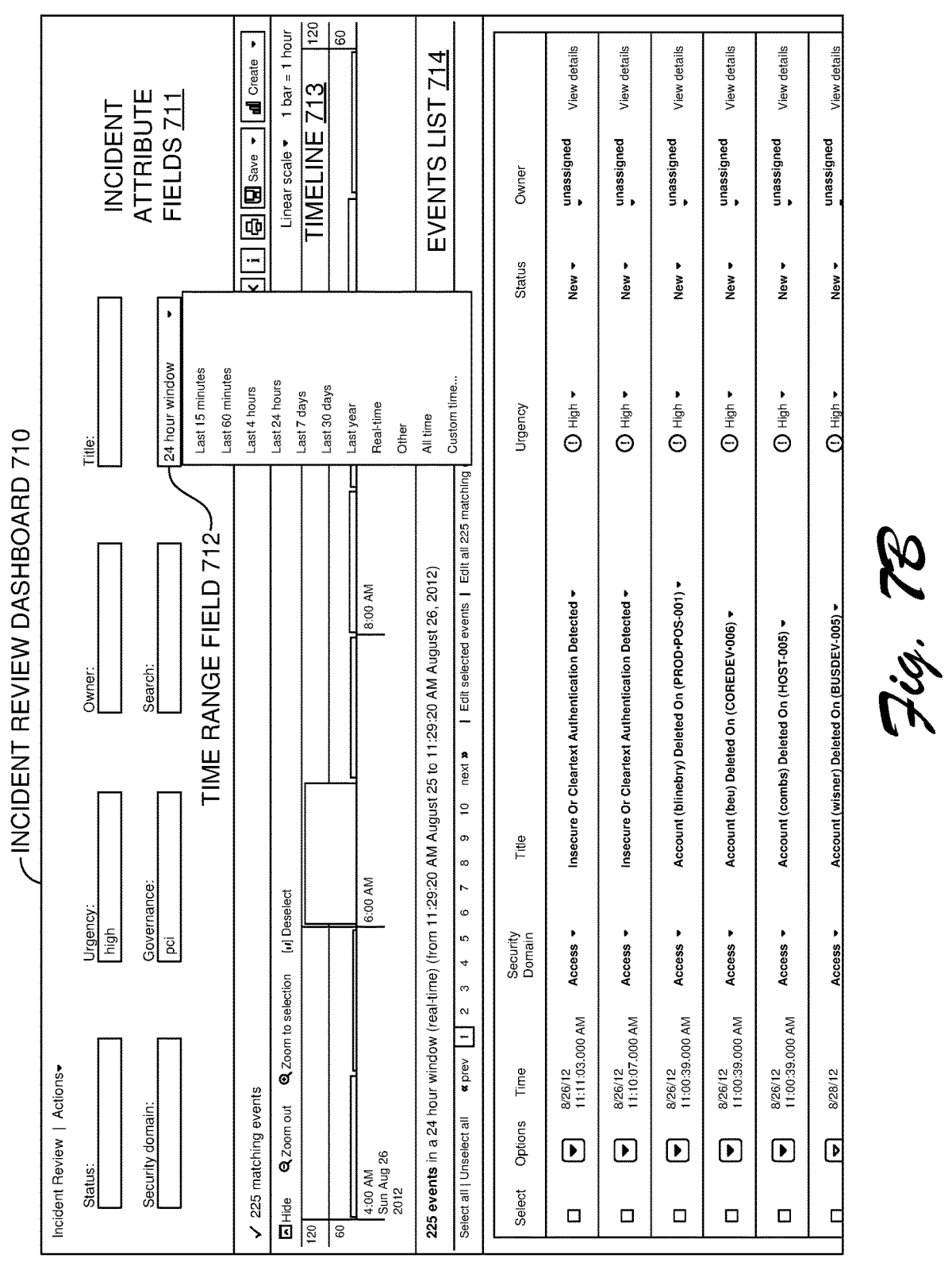

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 7B illustrates an exemplary incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of each of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167, 316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 7C:
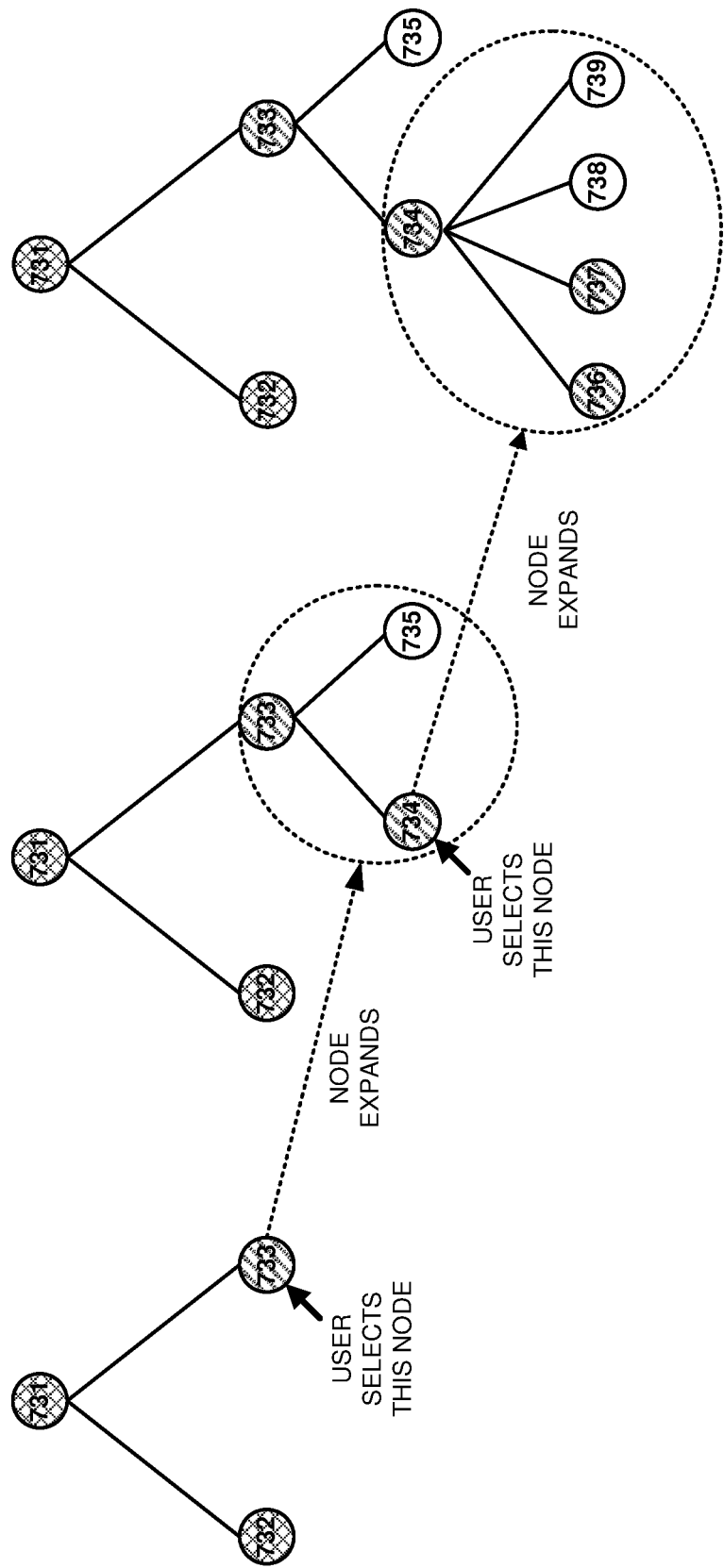
FIG. 7C illustrates a proactive monitoring tree in accordance with the disclosed implementations.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 7C, wherein nodes 733 and 734 are selectively expanded. Note that nodes 731-739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 7D:
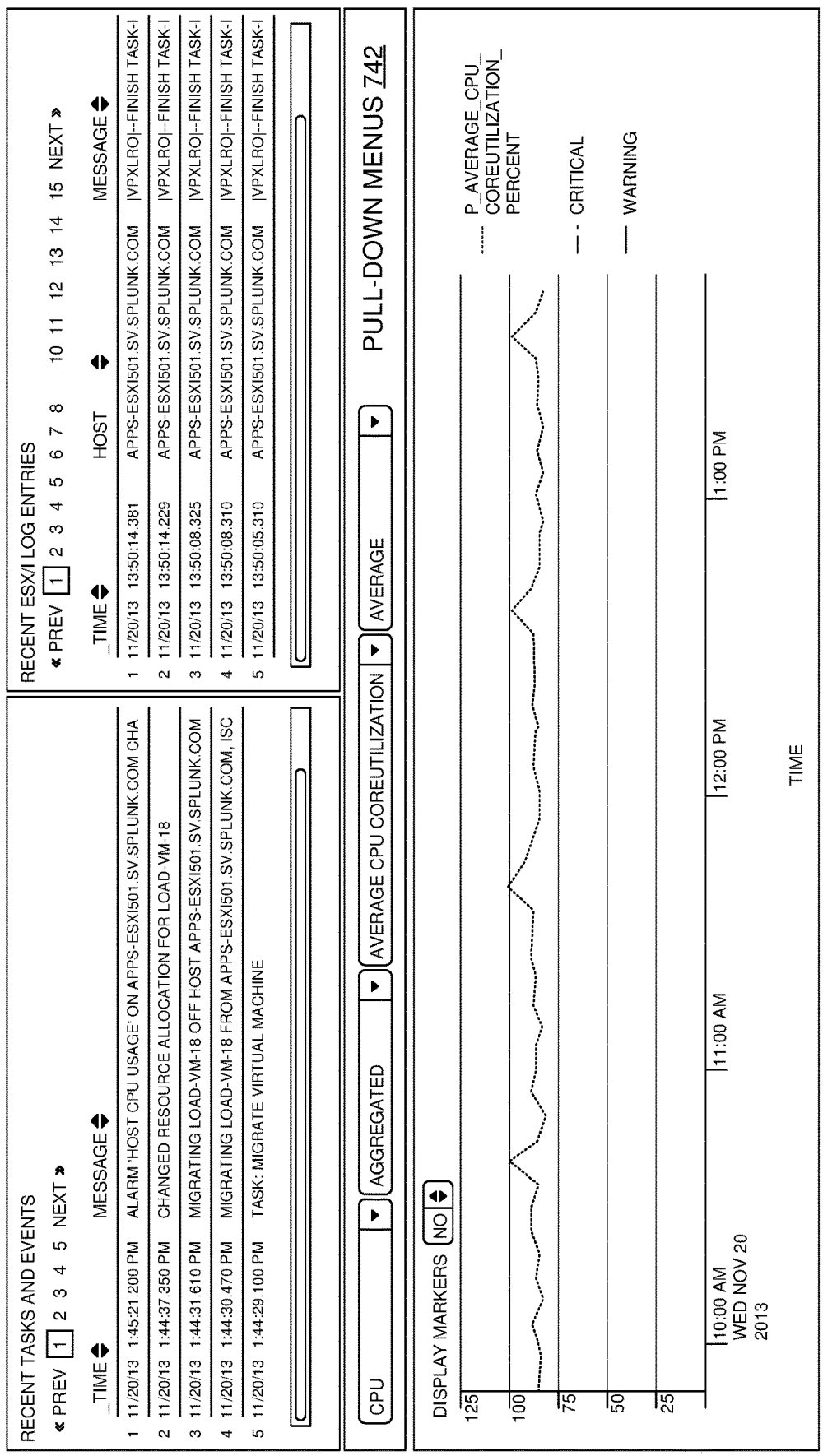
FIG. 7D illustrates a screen displaying both log data and performance data in accordance with the disclosed implementations.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 7D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

Event Time Selection

FIG. 8 depicts an example of a user interface 800 that displays a plurality of events resulting from a search performed using one or more extraction rules of a late-binding schema. As previously described, searches performed by the system 100 of FIG. 1 may involve vast amounts of data to locate events 802, 804, 806, 808 that correspond to the search using one or more extractions rules, e.g., "on the fly." Events 802-808, for instance, may comprise a collection of data that is correlated with a respective point in time. As shown in the user interface 800, for instance, event 802 corresponds to "12:25:21.201 AM" on "9/17/14," event 804 corresponds to "12:25:21.191 AM" on "9/17/14," event 806 corresponds to "12:25:21.175 AM" on "9/17/14," and event 808 corresponds to "12:25:21.159 AM" on "9/17/14." Each of these events 802-808 in the user interface 800 also includes a respective portion of data that corresponds to the event. For example, event 802 includes data 810 that is based on selected fields 814 as well as raw data 818 that is the content (e.g., payload) of the event 802.

Oftentimes when analyzing data, a user may become interested in events close to a point in time of a particular event. For example, the user may perform a search and become interested in a particular event, such as event 802. Upon investigating the event 802, the user may desire additional information on "what happened" surrounding the event. Conventional techniques to obtain this additional information, however, typically involve manual reentry of the extraction rule along with additional conditions specifying a desired time range, which could be inefficient and become frustrating to a user. For example, these techniques may involve manual reentry of search conditions in the search bar 816 for each successive search.

Accordingly, event time selection techniques are described in which interaction may be supported with an event to cause output of an option to specify a relative time in relation to the point in time of the event, such a range of time and so on. For example, in the illustrated user interface 800 a user may select a toggle 812 to display a user interface include a listing of fields associated with the event, an example of which is discussed as follows and shown in a corresponding figure.

Figure 9:
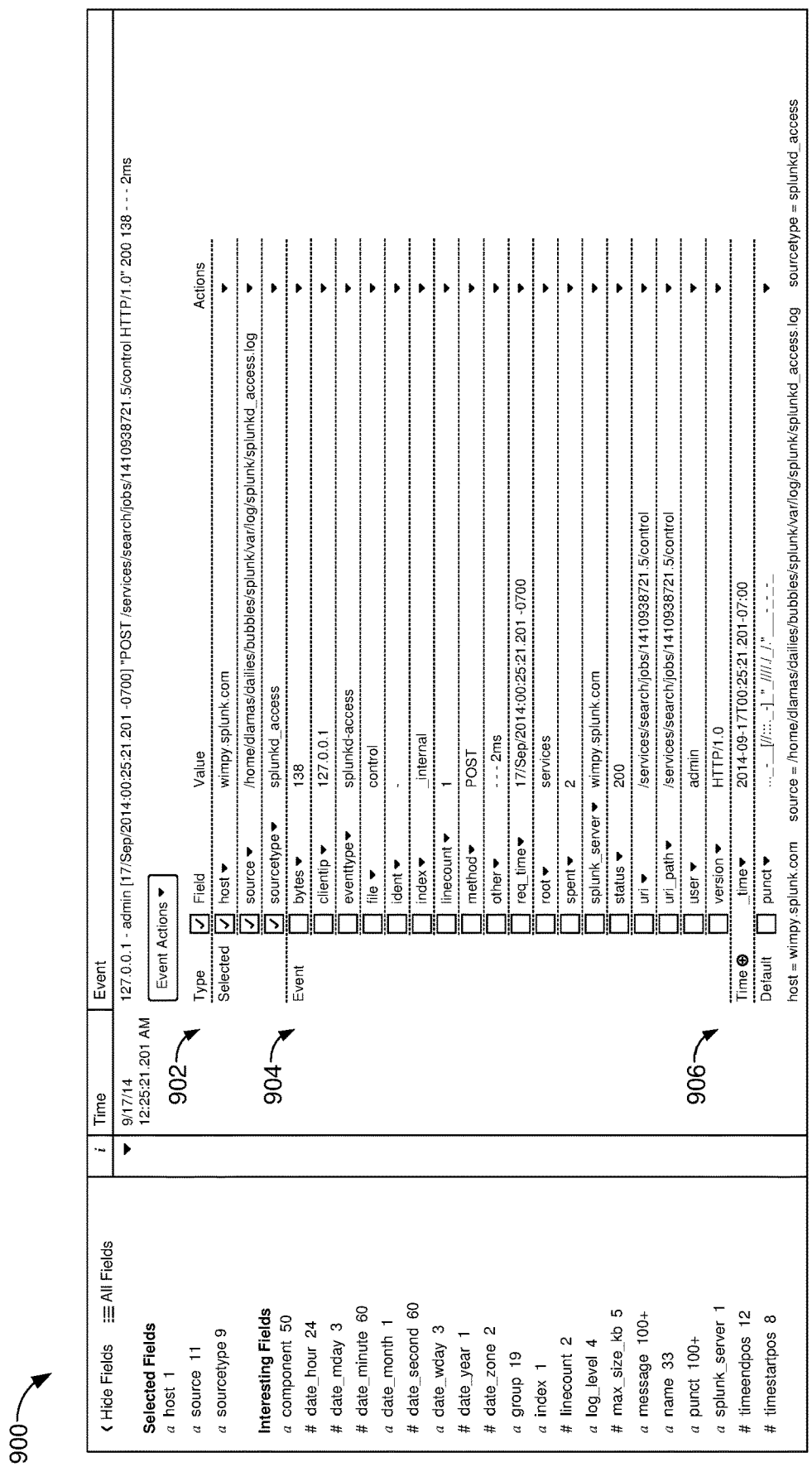
FIG. 9 depicts an example of a user interface that is output in response to user interaction involving selection of a toggle of FIG. 8.

FIG. 9 depicts an example of a user interface 900 that is output in response to user interaction involving selection of a toggle 812 of FIG. 8. The user interface 900 in this example is configured as an event-limited field picker that is operable to enable selection of data associated with individual events to display in the view of events, if applicable. The event-limited field picker, for instance, may also be utilized to specify metadata 902 associated with the event. As illustrated, for instance, a user may select host, source, and source type fields that cause display of corresponding values of the metadata in the user interface 800 of FIG. 8.

The event-limited field picker of the user interface 900 may also support options for a user to specify that values for fields 904 of the search are to be displayed in the user interface 800 of FIG. 8. As previously described, each field 904 in the event-limited field picker is defined according to an extraction rule that includes one or more instructions specifying how to extract a value for a field defined by the rule from the data stored as events. For examples, events such as bytes, method, file, user, version, and so on may be selected to cause display of values from corresponding fields in the user interface 800 of FIG. 8.

The user interface also includes a display of a representation 906 of the point in time associated with the event 802 of FIG. 8. The representation 906 is selectable to cause output of an option to specify a relative time in relation to the point in time depicted by the representation 906, an example of which is discussed in the following and shown in a corresponding figure.

Figure 10:
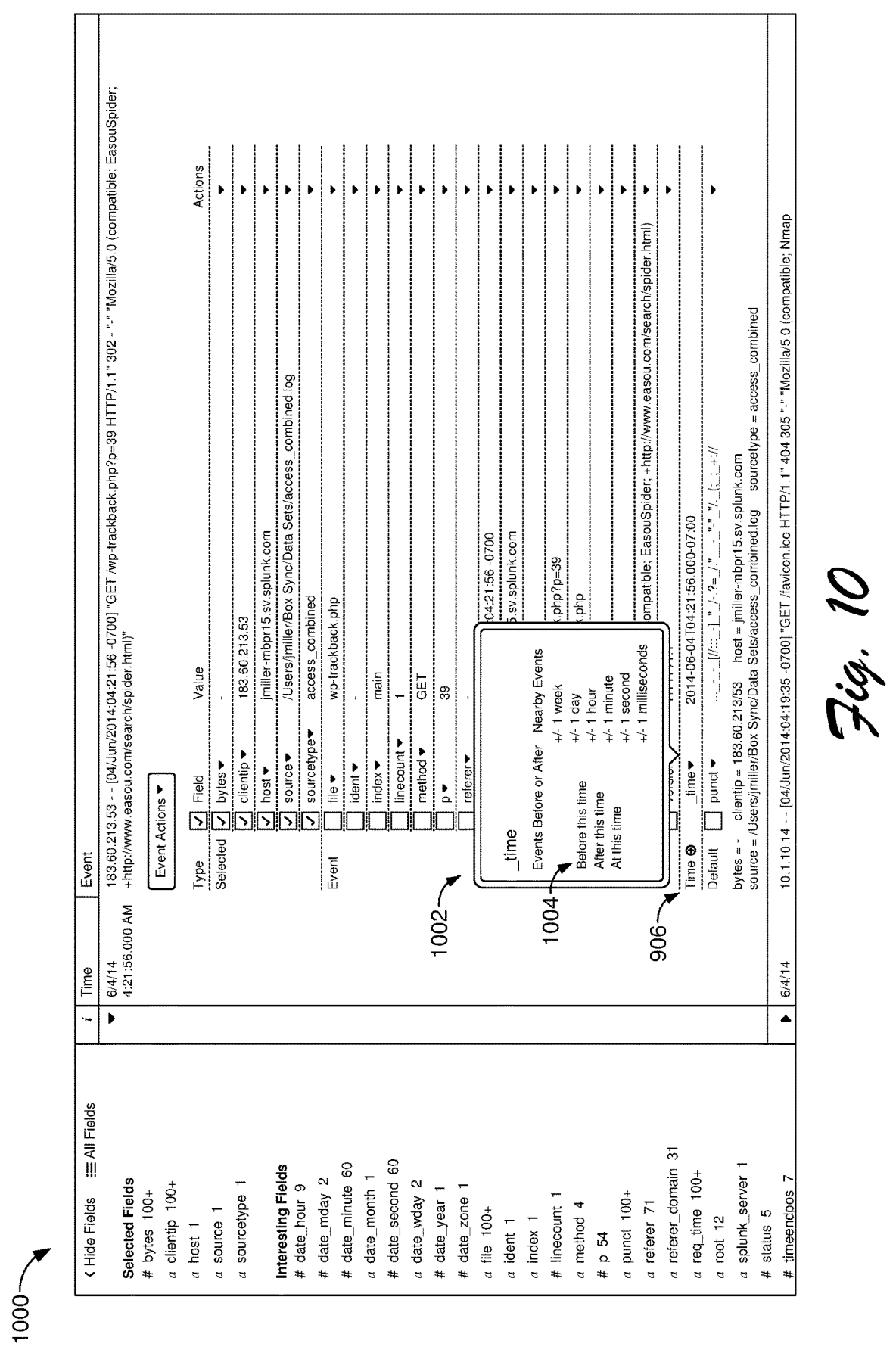

FIG. 10 depicts an example of a user interface 1000 that includes an output of an option 1002 that is selectable to specify a relative time in relation to a point in time of a corresponding event. In this example, the option 1002 is displayed as a pop-up window disposed proximal to the representation 906 of the point in time of the event. The option 1002 includes portions 1004 that are selectable to specify a relative time in relation to the point in time of the event, such as a relative time before the point in time, after the point in time, at the point in time, and so on.

Figure 11:
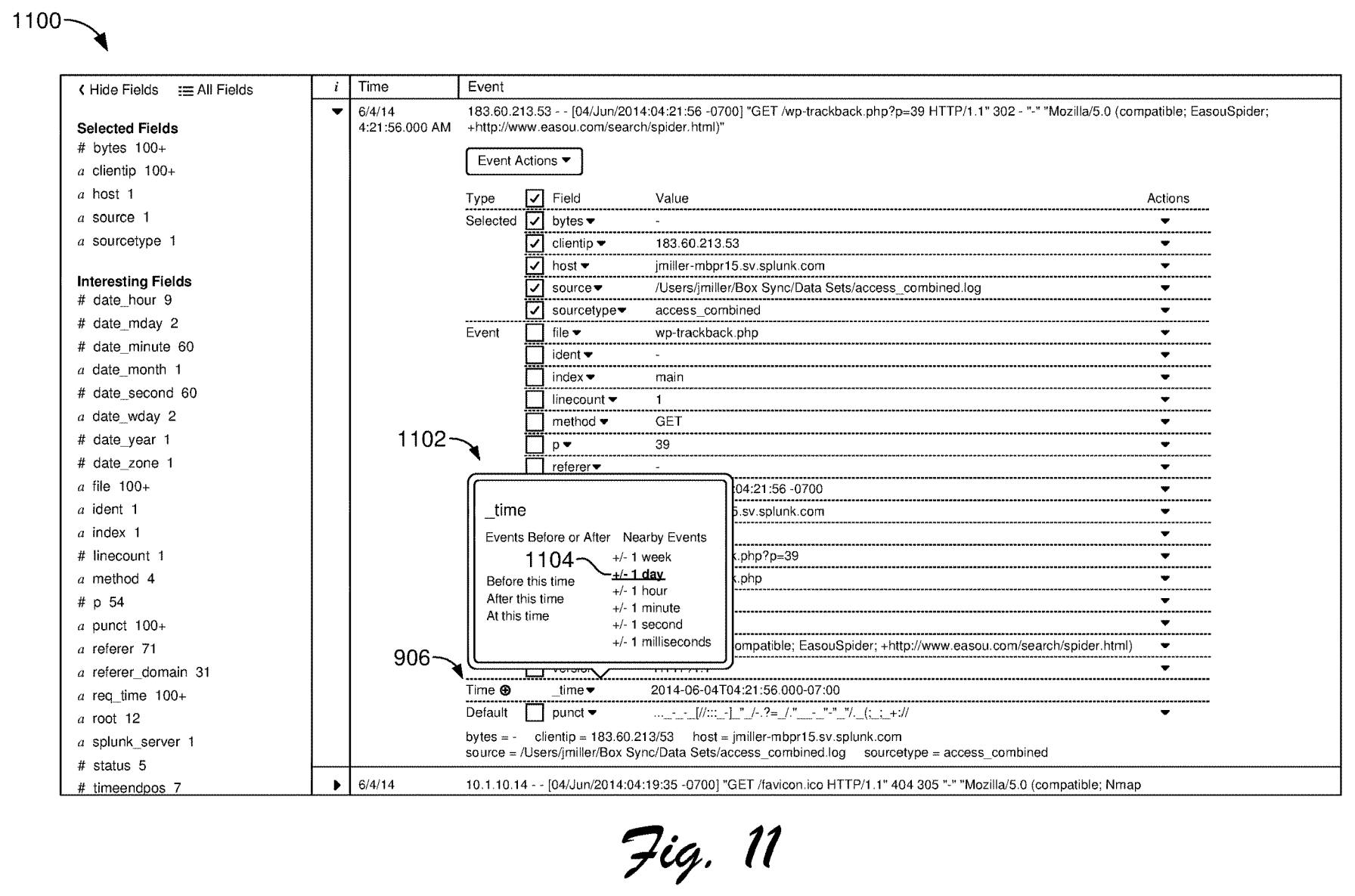

Further, the option 1002 also includes portions that are selectable to specify ranges, such as +/− one week, day, hour, minute, second, millisecond, and so on. The user interface 1100 of FIG. 11 depicts an example of selection of "+/−1 day" portion 1104 of the option 1002. In this way, a user may interact with the option to specify a relative time in relation to the point in time associated with the event.

Once selected, a variety of different actions may be performed. For example, the extraction rules used to obtain the results of the search may be modified automatically and without user intervention to include the relative time and redo the search. In this way, the relative point in time may be included as part of the search automatically and without further user intervention, e.g., without manually reentering the extraction rules along with the relative point in time. For example, the relative time may be automatically inserted into a search bar and performance of the search may be repeated to include the relative time and the previous conditions. In another example, the specification of the relative point in time may be a basis of application of a new extraction rule that does not include conditions of the previous extraction rule and as such as user may "scope out" from the previous extraction rule to view events surrounding the displayed event. For example, the relative time may form a new extraction rule that is automatically populated in the search bar without the previous terms to perform a new search. A variety of other examples are also contemplated.

Figure 12:
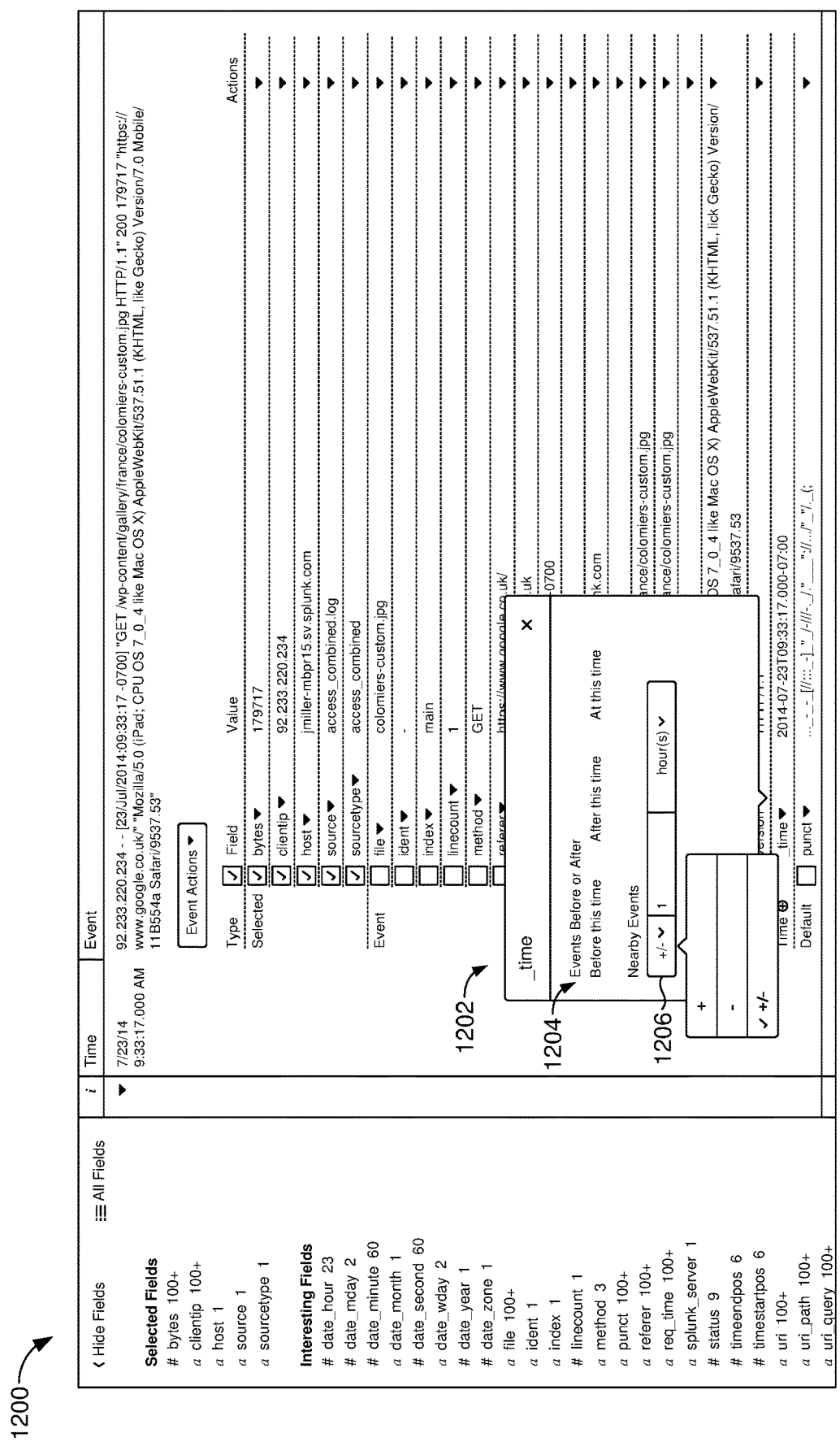
FIG. 12 depicts another example of a user interface showing another example of an option that is usable to specify a relative time in relation to a point in time of an event.

FIG. 12 depicts another example of a user interface 1200 showing another example of an option 1202 that is usable to specify a relative time in relation to a point in time of an event. In the previous example of FIG. 10, the option 1002 included portions 1204 specifying static examples of ranges that are selectable to specify relative times surrounding the point in time of the event. In the option 1202 of FIG. 12, however, a user may manually specify a relative time using portions 1204 to indicate an amount of time before and/or after the point in time, an amount of time, and a unit of time. As illustrated in FIG. 12, for instance, a user selects a "+/−" portion 1206 of the option 1202 to specify a time range before and after the point in time of the event.

Figure 13:
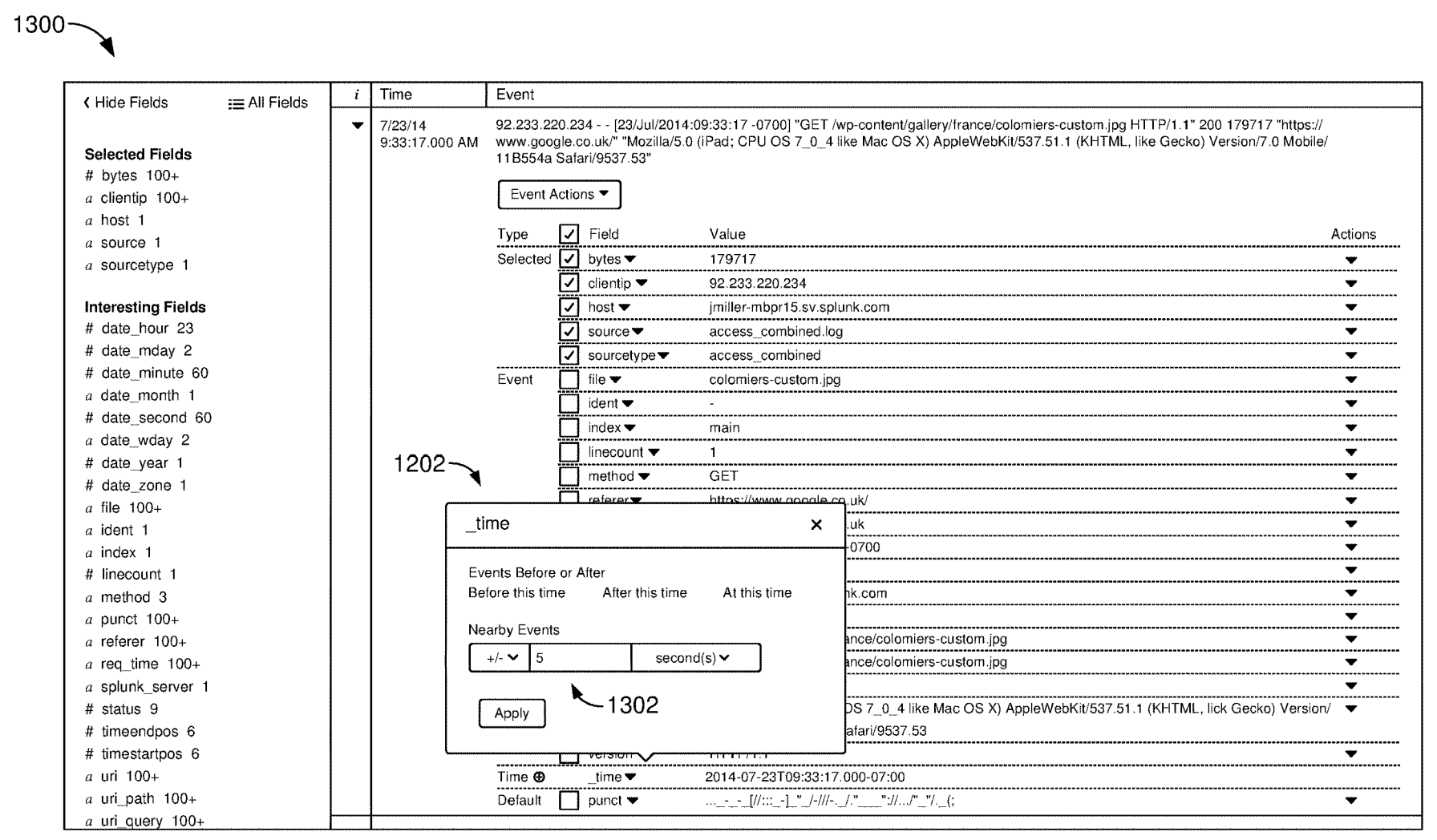
Figure 14:
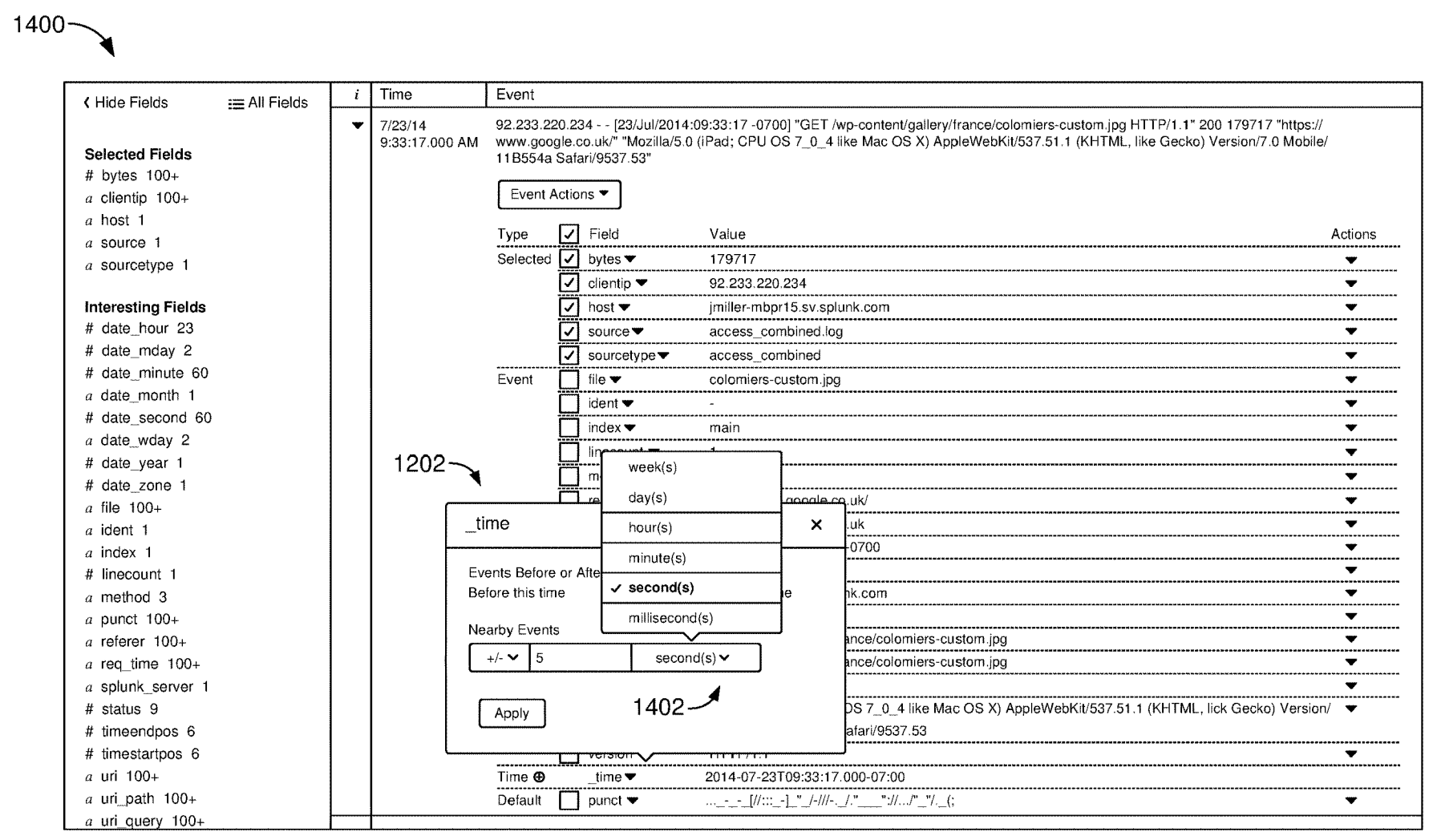

FIG. 13 depicts a user interface 1300 showing specification of a unit of time using the option 1202 of FIG. 12. In this example, a user specifies a number "5" 1302 that along with specification of a unit of time "seconds" may be used to specify a relative amount of time in relation to the point in time of the event. For example, FIG. 14 depicts a user interface 1400 showing specification of a unit of time using the option 1202 of FIG. 12. As illustrated, a portion 1402 of the user interface may support user interaction to specify units of time, such as weeks, days, hours, minutes, seconds, milliseconds, and so on.

Figure 15:
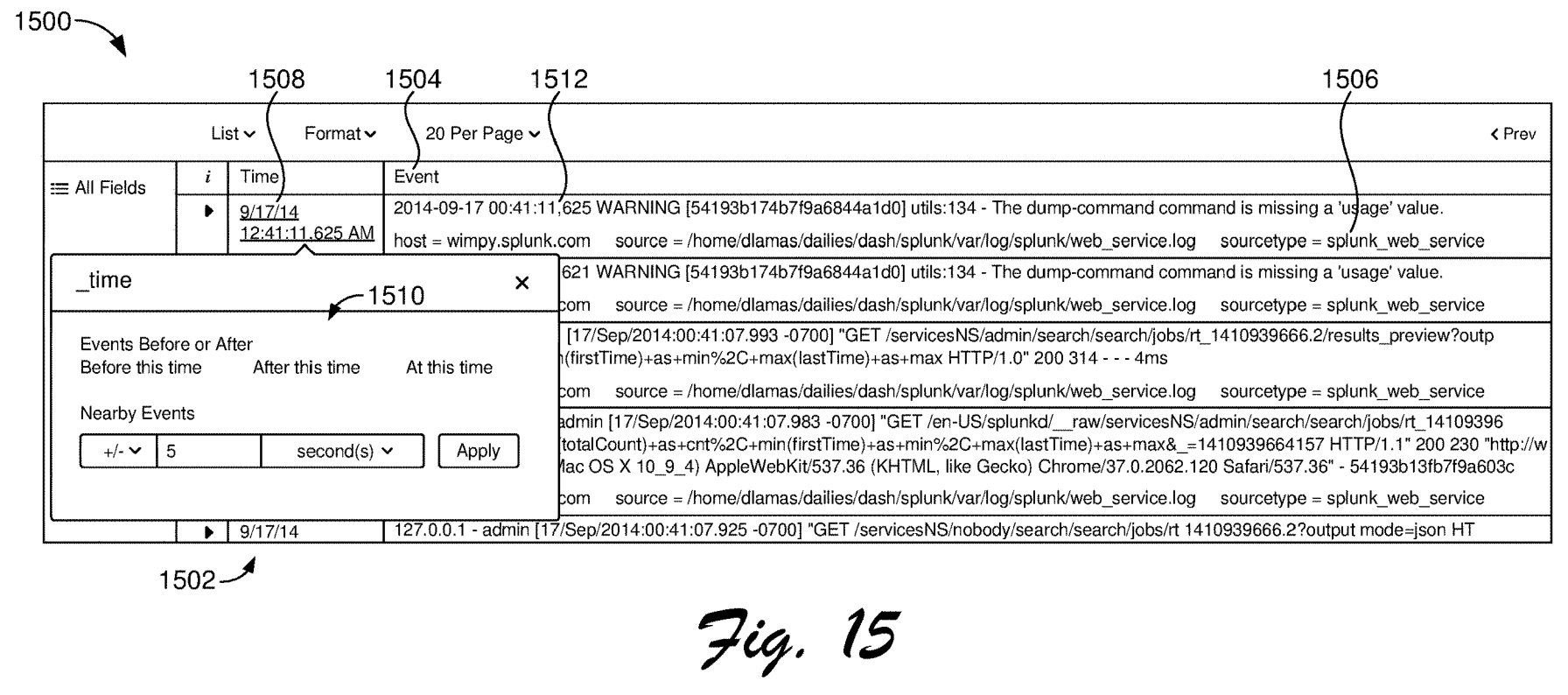

FIG. 15 depicts a user interface 1500 showing another example of an option 1502 that is usable to specify a relative time in relation to a point in time of an event. In this example, an event 1504 and portions of data 1506 included in the event 1504 as specified by the field picker and raw data 1512 as described above. The event 1504 also includes a representation 1508 of the point in time corresponding to the event, e.g., "9/17/14" and "12:41:11.625 AM." A user may select the representation 1506, e.g., through hovering or "clicking" a cursor control device, gesture, voice command, and so on, which causes output of the option 1502.

As previously described, the option 1502 includes portions that are configured to specify a relative time in relation to the point in time represented 1508 for the event 1504. As illustrated, this may include portions 1510 to specify a relative time before, after, or at the represented 1508 point in time, may be utilized to specify a range, and so on. Thus, in this example a user is provided with a non-modal option 1502 (e.g., as a pop-up menu) to specify the relative time without navigating away from the user interface, e.g., as was performed in FIGS. 9-14. Other non-modal examples are also contemplated, further discussion of which may be found in the following and is shown in corresponding figures.

Figure 16:
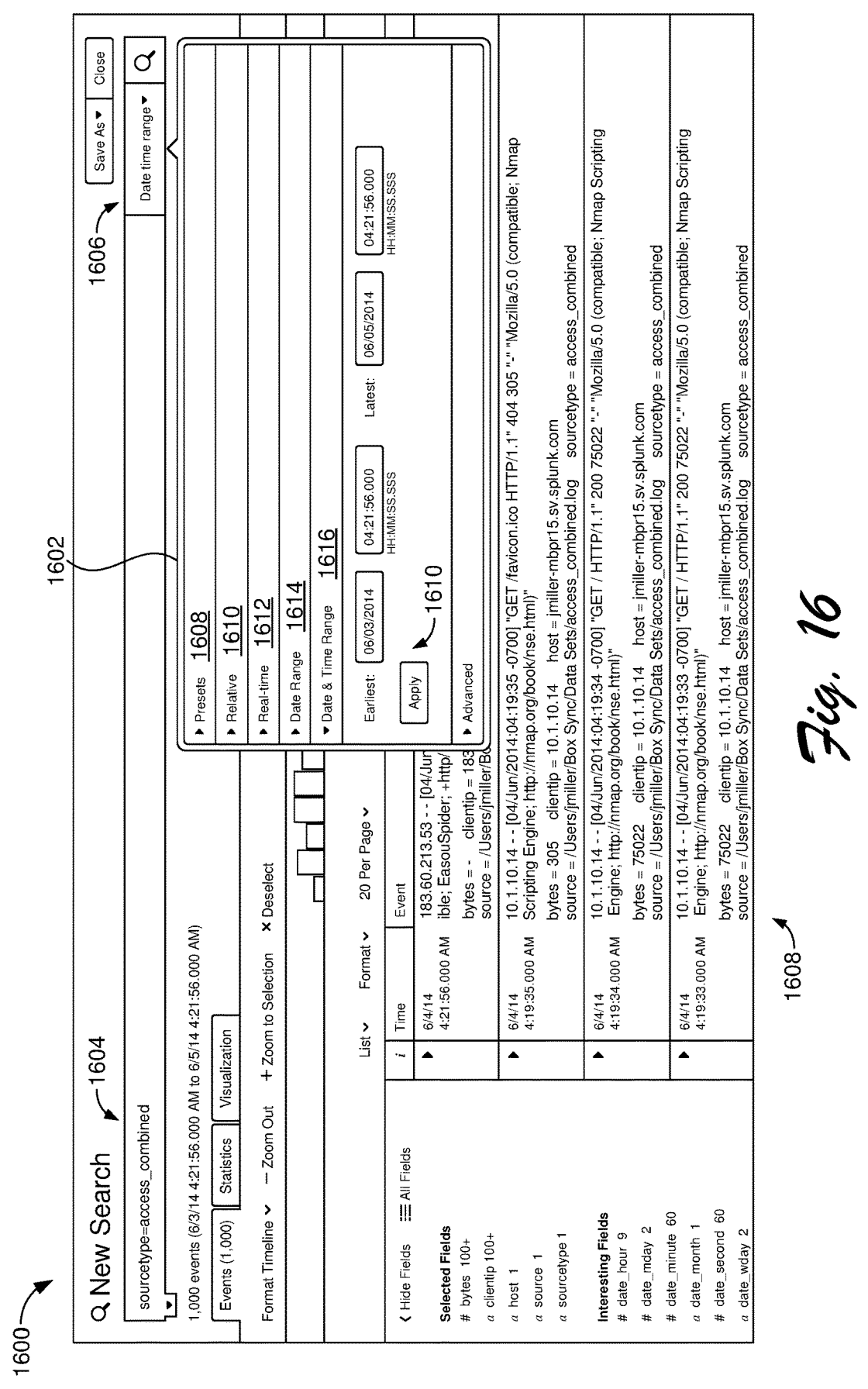

FIG. 16 depicts a user interface 1600 showing yet another example of an option 1602 that is usable to specify a relative time in relation to a point in time of an event. The user interface 1600 in this example includes a search input portion 1604 (e.g., a search bar) via which a user may specify extraction rules to be used to perform a search, e.g., as part of a late-binding schema as previously described.

The user interface also includes the option 1602 that is associated as part of the search input portion 1604. Selection of a feature 1606 that is a representation of functionality to select a date/time range, for instance, may cause output of the option 1602. The option 1602, as before, is configured to specify a relative time in relation to a point in time of one or more of the events 1608 displayed in the user interface 1600.

Figure 18:
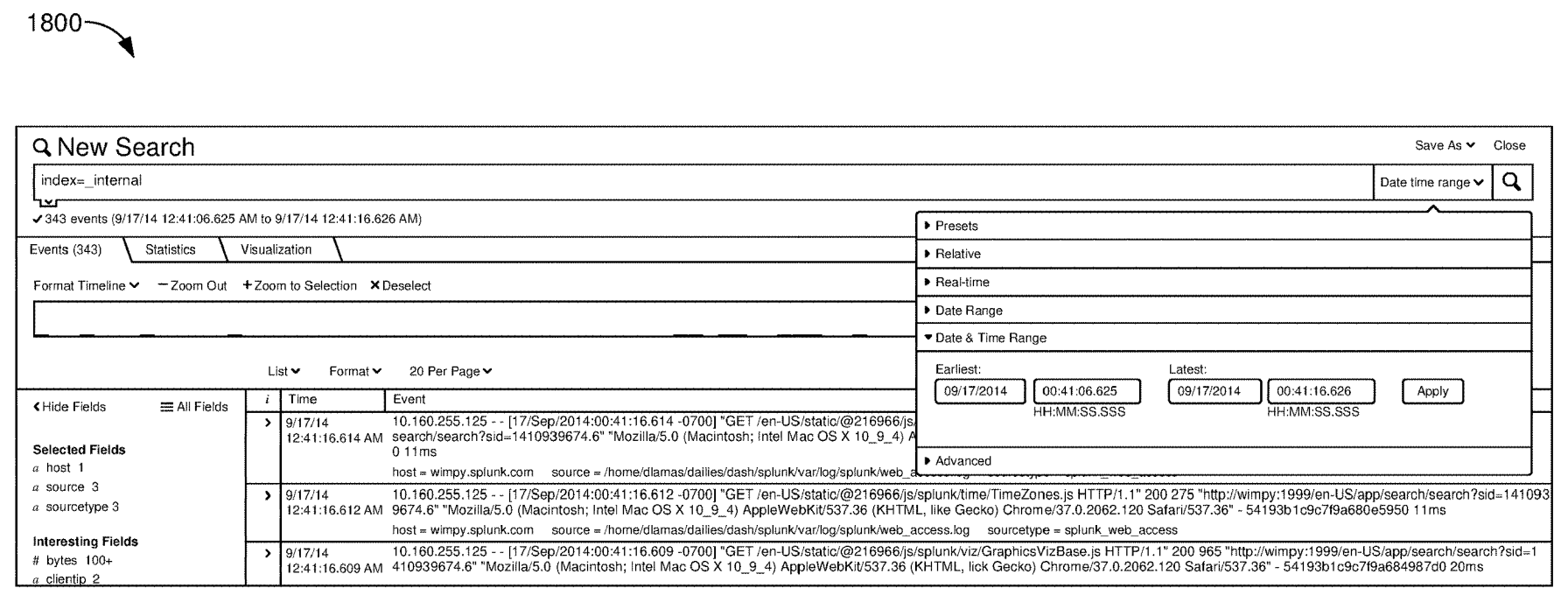

For example, the option 1602 in this example includes portions that are selectable to specify preset 1608 relative points in time (e.g., +/− day as before) that are selectable to specify predefined relative points in time, relative 1610 points in time, a date range 1614, a date and time range 1616, and so on. The option 1602 may also include a portion to specify application to real time 1612 data. Selection of an apply 1610 option may then cause the specified data to be populated into the search input portion 1604 to perform the search using these conditions, e.g., as part of the previous search or a new search using just those conditions as previously described. FIGS. 17 and 18 illustrate additional examples of user interfaces 1700, 1800 in which the option is associated with a search input portion. Further discussion of these and other techniques may be found in relation to the following procedures.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-18.

Figure 19:
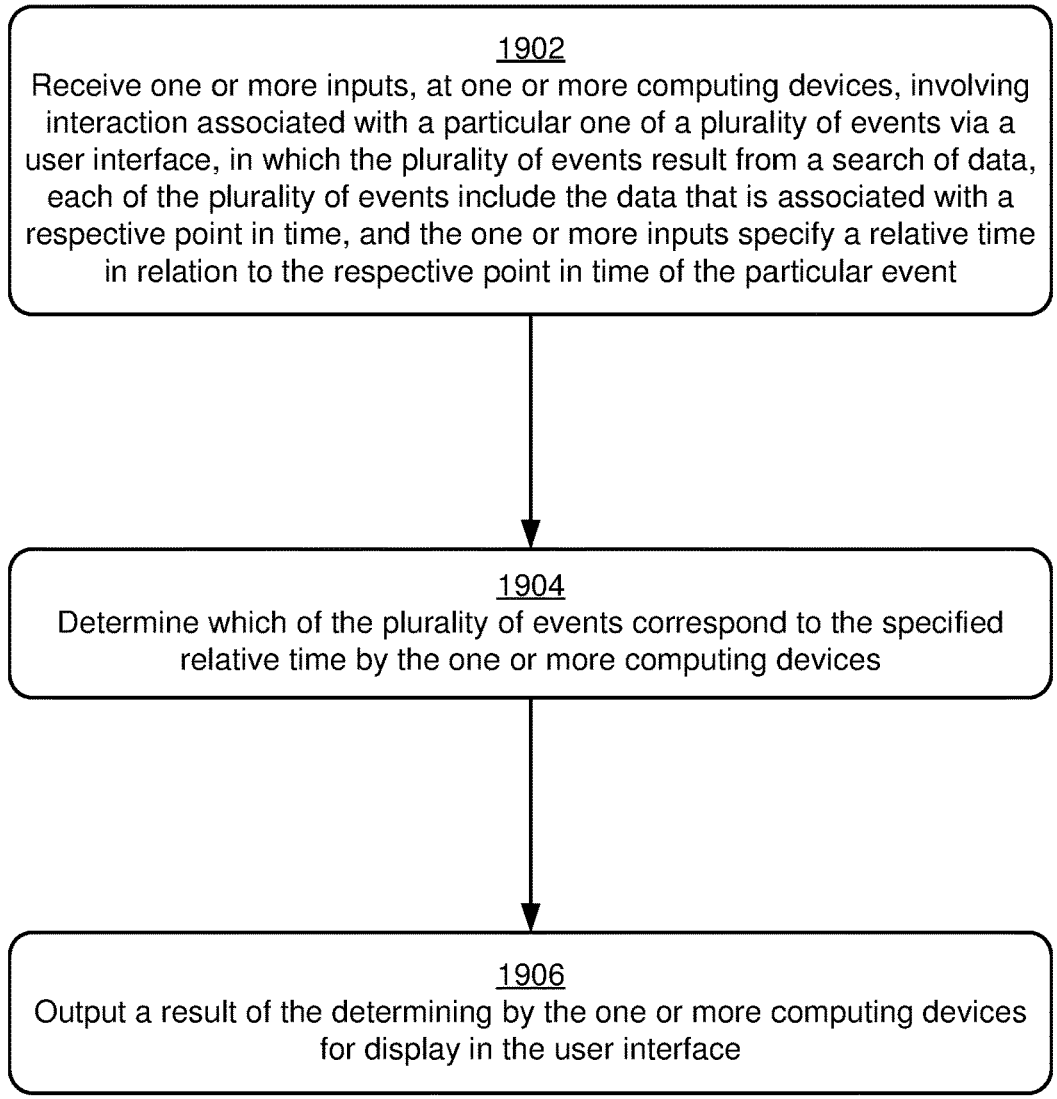
FIG. 19 is a flow diagram depicting a procedure in an example implementation in which event time selection techniques are described.

FIG. 19 depicts a procedure 1900 in an example implementation in which a relative time is specified in relation to an event to cause output of events that correspond to the relative time. One or more inputs are received, at one or more computing devices, that involve interaction associated with a particular one of a plurality of events via a user interface, in which the plurality of events result from a search of data, each of the plurality of events include the data that is associated with a respective point in time, and the one or more inputs specify a relative time in relation to the respective point in time of the particular event (block 1902). For example, a user may interact with a search UI 108 of a client application module 106. The search UI 108 may be configured to include options to specify the relative point in time, such as option 1102, option 1202, option 1502, option 1602, and so on. Inputs resulting from this interaction may then be communicated via a network to system 100 for processing, may be performed locally, and so on.

A determination is made as to which of the plurality of events correspond to the specified relative time by the one or more computing devices (block 1904). This may be performed as a new search in which the relative time is a sole query for the search, automatically added as part of a previous search, and so on. Further, this search may be performed by the system 100, locally at the client application module 106, and so forth.

A result of the determination is then output by the one or more computing devices for display in the user interface (block 1906). The system 100, for instance, may generate the output for communication via a network to the client application module 106 for output in the search UI 108, such as to display the events and corresponding data that corresponds to the relative time, e.g., falls with a time range, is "at" the point in time, and so forth. A variety of other examples are also contemplated without departing from the spirit and scope of the techniques described herein.

Example System and Device

Figure 20:
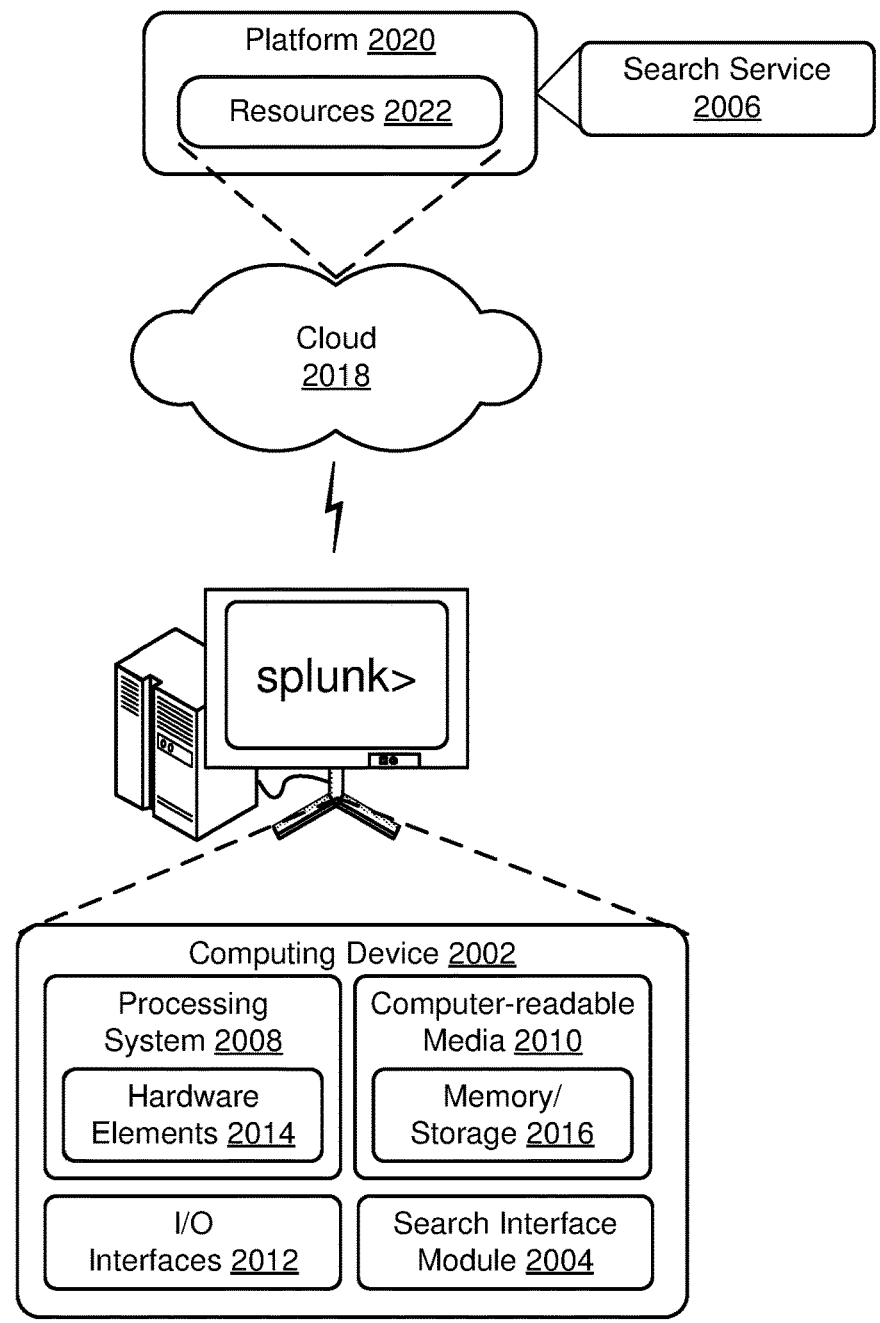
FIG. 20 illustrates an example system including various components of an example device that can be implemented as any type of computing device as described and/or utilize with reference to FIGS. 1-19 to implement embodiments of the techniques described herein.

FIG. 20 illustrates an example system generally at 2000 that includes an example computing device 2002 that is representative of one or more computing systems and/or devices that may implement the various techniques described herein. This is illustrated through inclusion of the search interface module 2004 that is representative of functionality to interact with a search service 2006, e.g., to specify and manage searches using a late-binding schema and events as described above and thus may correspond to the client application module 106 and system 100 of FIG. 1. The computing device 2002 may be, for example, a server of a service provider, a device associated with a client (e.g., a client device), an on-chip system, and/or any other suitable computing device or computing system.

The example computing device 2002 as illustrated includes a processing system 2008, one or more computer-readable media 2010, and one or more I/O interface 2012 that are communicatively coupled, one to another. Although not shown, the computing device 2002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2008 is representative of functionality to perform one or more operations using hardware. Accordingly, the processing system 2008 is illustrated as including hardware element 2014 that may be configured as processors, functional blocks, and so forth. This may include implementation in hardware as an application specific integrated circuit or other logic device formed using one or more semiconductors. The hardware elements 2014 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2010 is illustrated as including memory/storage 2016. The memory/storage 2016 represents memory/storage capacity associated with one or more computer-readable media. The memory/storage component 2016 may include volatile media (such as random access memory (RAM)) and/or nonvolatile media (such as read only memory (ROM), Flash memory, optical disks, magnetic disks, and so forth). The memory/storage component 2016 may include fixed media (e.g., RAM, ROM, a fixed hard drive, and so on) as well as removable media (e.g., Flash memory, a removable hard drive, an optical disc, and so forth). The computer-readable media 2010 may be configured in a variety of other ways as further described below.

Input/output interface(s) 2012 are representative of functionality to allow a user to enter commands and information to computing device 2002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2014 and computer-readable media 2010 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2014. The computing device 2002 may be configured to implement particular instructions and/or functions corresponding to the software and/or hardware modules. Accordingly, implementation of a module that is executable by the computing device 2002 as software may be achieved at least partially in hardware, e.g., through use of computer-readable storage media and/or hardware elements 2014 of the processing system 2008. The instructions and/or functions may be executable/operable by one or more articles of manufacture (for example, one or more computing devices 2002 and/or processing systems 2008) to implement techniques, modules, and examples described herein.

The techniques described herein may be supported by various configurations of the computing device 2002 and are not limited to the specific examples of the techniques described herein. This functionality may also be implemented all or in part through use of a distributed system, such as over a "cloud" 2018 via a platform 2020 as described below.

The cloud 2018 includes and/or is representative of a platform 2020 for resources 2022. The platform 2020 abstracts underlying functionality of hardware (e.g., servers) and software resources of the cloud 2018. The resources 2022 may include applications and/or data that can be utilized while computer processing is executed on servers that are remote from the computing device 2002. Resources 2022 can also include services provided over the Internet and/or through a subscriber network, such as a cellular or Wi-Fi network.

The platform 2020 may abstract resources and functions to connect the computing device 2002 with other computing devices. The platform 2020 may also serve to abstract scaling of resources to provide a corresponding level of scale to encountered demand for the resources 2022 that are implemented via the platform 2020. Accordingly, in an interconnected device embodiment, implementation of functionality described herein may be distributed throughout the system 2000. For example, the functionality may be implemented in part on the computing device 2002 as well as via the platform 2020 that abstracts the functionality of the cloud 2018.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
employing a graphical user interface (GUI) to cause display of a first subset of events, wherein a first event of the first subset of events includes a timestamp;
in response to receiving a first selection associated with the first event, causing display of a first option that is selectable to specify a relative time in relation to the timestamp of the first event, such that the GUI displays the first option concurrently with displaying the first subset of events; and
in response to receiving a second selection that corresponds to the first option, employing the GUI to cause display of a second subset of events based on a determination that timestamps included in the second subset of events correspond to the relative time.

2. The method of claim 1, wherein the first subset of events is identified via performing a search of a set of events.

3. The method claim 1, wherein the first subset of events is identified via performing a search of a set of events and the search is performed using one or more extraction rules of a late-binding schema applied to a portion of raw machine data that encodes the set of events.

4. The method of claim 1, wherein the first or the second selection is a selection of a display of the timestamp included in the first event.

5. The method of claim 1, wherein the first or the second selection comprises an interaction with a representation of the timestamp included in the first event.

6. The method of claim 1, wherein the first or the second selection comprises an interaction with a representation of the timestamp included in the first event, the representation included with a display of a plurality of fields corresponding to a portion of raw machine data encoding the first event.

7. The method of claim 1, wherein the first or the second selection comprises a non-modal interaction with an option output in response to an initial selection of a representation of the timestamp included in the first event.

8. The method of claim 1, wherein the first or the second selection comprises an interaction with the first event through an initial selection of a feature associated with a search input portion of the GUI.

9. The method of claim 1, wherein the first option indicates the relative time as a range of time in relation to the timestamp included in the first event.

10. The method of claim 1, wherein the second selection associated with the first option causes an automatic determination, via one or more computing devices, of the relative time as an amount of time in relation to the timestamp included in the first event automatically and the automatic determination is independent of manual entry of the relative time.

11. The method of claim 1, wherein the first option is configured to receive a first time within a temporal window associated by the timestamp included in the first event, and the relative time is automatically determined from the first time.

12. The method of claim 1, wherein the causing the display of the first option comprises causing display of one or more interface elements associated with the first option, and the second selection is of the one or more interface elements.

13. The method of claim 1, wherein the relative time is a range of time, and the second selection causes an execution of a search query that identifies the second subset of events from a set of events and the search query is associated with the range of time.

14. The method of claim 1, wherein the display of the first subset of events is in an events list of the GUI, and the display of the second subset of events replaces the first subset of events in the events list with the second subset of events.

15. The method of claim 1, wherein the first subset of events is determined from a set of events and the second subset of events is determined from the set of events.

16. The method of claim 1, wherein the first option is selectable to specify the relative time based at least on manually indicating an amount of time in relation to the timestamp.

17. The method of claim 1, wherein the GUI displays a set of options that includes the first option and the displayed set of options includes a list of relative points in time, each relative point in time being a different amount of time to offset the timestamp included in the first event to result in the relative time.

18. The method of claim 1, wherein the second selection comprises an interaction with a non-modal option in a pop-up menu, displayed by the GUI, that specifies the relative time without navigating away from the GUI.

19. The method of claim 1, wherein the first option indicates an amount of time before or after the timestamp included in the first event, and the relative time is automatically determined from the amount of time.

20. The method of claim 1, wherein the first selection is of a representation of the timestamp included in the first event.

21. A computer-implemented system comprising:
a processor device; and
a computer-readable storage medium, coupled with the processor device, having instructions stored thereon, which, when executed by the processor device, performs actions comprising:
employing a graphical user interface (GUI) to cause display of a first subset of events, wherein a first event of the first subset of events includes a timestamp;
in response to receiving a first selection associated with the first event, causing display of a first option that is selectable to specify a relative time in relation to the timestamp of the first event, such that the GUI displays the first option concurrently with displaying the first subset of events; and
in response to receiving a second selection that corresponds to the first option, employing the GUI to cause display of a second subset of events based on a determination that timestamps included in the second subset of events correspond to the relative time.

22. The system of claim 21, wherein the first selection comprises an initial selection of a display of the timestamp included in the first event.

23. The system of claim 21, wherein the first or the second selection comprises an interaction with a representation of the timestamp included in the first event.

24. The system of claim 21, wherein the first or the second selection comprises an interaction with a representation of the timestamp included in the first event, the representation included with a display of a plurality of fields corresponding to a portion of raw machine data encoding the first event.

25. The system of claim 21, wherein the first or the second selection comprises an interaction with the first event through an initial selection of a feature associated with a search input portion of the GUI.

26. One or more non-transitory computer-readable storage media comprising instructions that are stored thereon that, responsive to execution by a computing device, causes the computing device to perform operations comprising:

employing a graphical user interface (GUI) to cause display of a first subset of events, wherein a first event of the first subset of events includes a timestamp;

in response to receiving a first selection associated with the first event, causing display of a first option that is selectable to specify a relative time in relation to the timestamp of the first event, such that the GUI displays the first option concurrently with displaying the first subset of events; and in response to receiving a second selection that corresponds to the first option, employing the GUI to cause display of a second subset of events based on a determination that timestamps included in the second subset of events correspond to the relative time.

27. The one or more computer-readable storage media of claim 26, wherein the first or the second selection comprises an initial selection of a display of the timestamp included in the first event.

28. The one or more computer-readable storage media of claim 26, wherein the first or the second selection comprises an interaction with a representation of the timestamp included in the first event.

29. The one or more computer-readable storage media of claim 26, wherein the first or the second selection comprises an interaction with a representation of the timestamp included in the first event, the representation included with a display of a plurality of fields corresponding to the first event in the GUI.

30. The one or more computer-readable storage media of claim 26, wherein the first or the second selection comprises an interaction with the first event through an initial selection of a feature associated with a search input portion of GUI.

* * * * *